E. B. ALLEN.
POWER TRANSMITTING MECHANISM.
APPLICATION FILED DEC. 20, 1917.
1,393,417.  Patented Oct. 11, 1921.
2 SHEETS—SHEET 2.
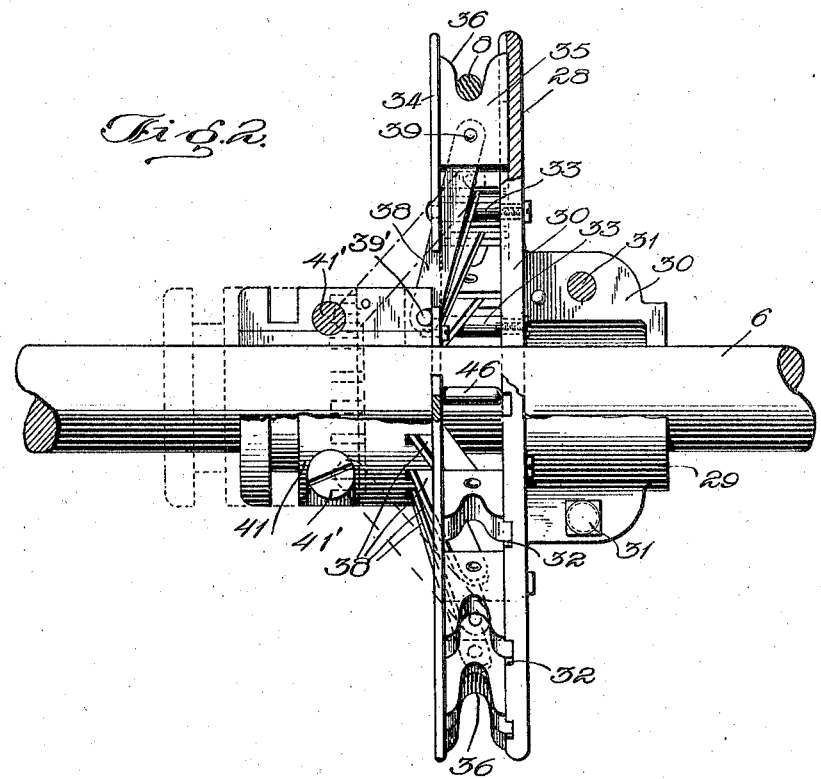
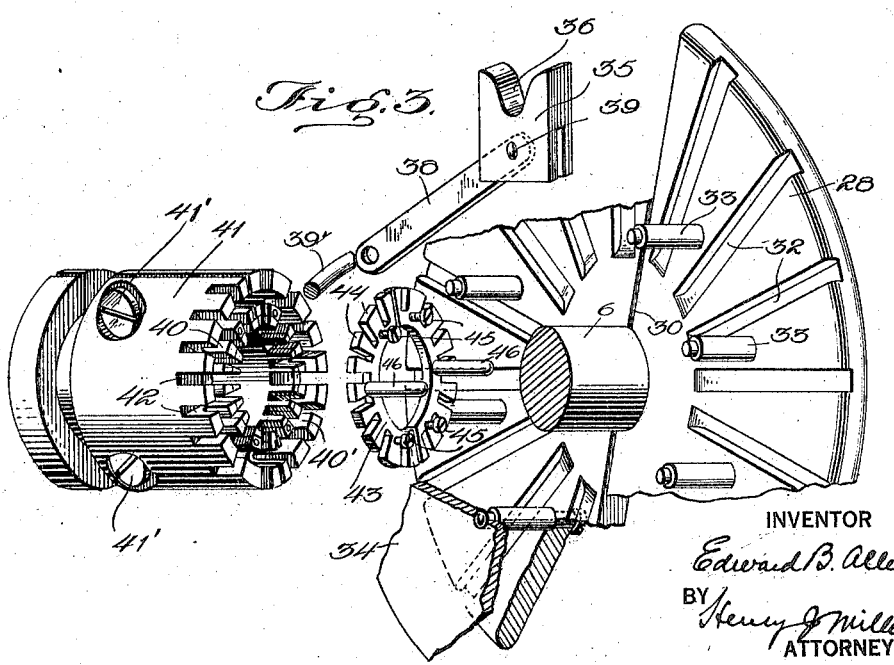
INVENTOR
Edward B. Allen
BY Henry J. Miller
ATTORNEY

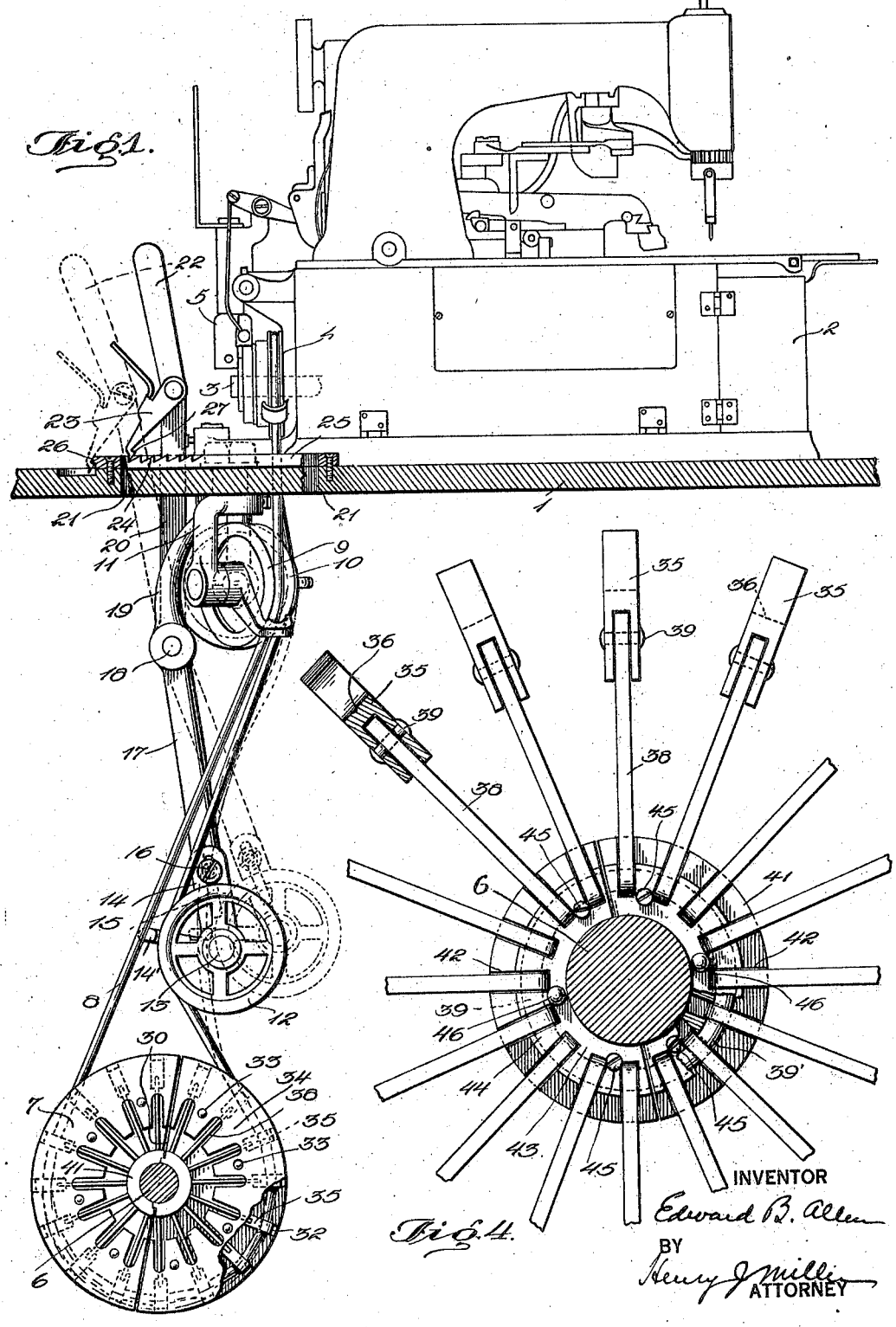

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

POWER-TRANSMITTING MECHANISM.

1,393,417.

Specification of Letters Patent.  Patented Oct. 11, 1921.

Application filed December 20, 1917. Serial No. 207,994.

*To all whom it may concern:*

Be it known that I, EDWARD B. ALLEN, a citizen of the United States, residing at Bridgeport, in the county of Fairfield and State of Connecticut, have invented certain new and useful Improvements in Power-Transmitting Mechanisms, of which the following is a specification, reference being had therein to the accompanying drawings.

This invention relates to power-transmitting mechanism, more particularly of the variable-speed type adapted for interposition between the driving shaft and a machine or device whose speed it is desired to vary to meet different operating positions.

For example, in buttonhole sewing machines adapted to sew heavy work, such as leather, the maximum speed of production is limited to that which will not cause overheating of the reciprocating needle. On lighter work, however, the machine may be successfully operated at much higher speeds. To secure maximum production from a machine used for different classes of work, therefore, it is highly desirable that the operator may quickly and easily change the speed of the machine to suit the particular class of work being operated upon.

Again, it is customary for garment manufacturers to arrange a number of sewing machines on a long power table having a constantly driven line-shaft extending lengthwise thereof and fitted at intervals with driving pulleys each of which is tightly belted to the loose pulley of a clutch-device or stop-motion mechanism for a corresponding one of the sewing machines. When certain of the machines are not in operation it will be apparent that the corresponding driving belts and loose pulley bearings will be subjected to useless wear and tear and, of course, there will be a waste of power.

Of the variable speed power-transmitting mechanisms heretofore devised, some are too complicated. Others require too much space for their installation. Others require a particular driving relationship between the driving and driven shafts. Still others are uncertain in their operation and require frequent attention to maintain them in operative condition.

An object of the present invention is to provide an improved power-transmitting mechanism, more particularly of the variable speed type in which many of the defects of prior mechanisms are overcome and which is simple in construction and efficient in operation.

A further object of the invention is to provide a variable speed power-transmitting mechanism which may be easily and effectively controlled by the operator while in operation and which will not require frequent adjustment to maintain it in efficient operative condition.

A further object of the invention is to provide a belt-connected power-transmitting mechanism suitable for use with similar mechanisms to transmit power from a line-shaft to a series of clutch-controlled machines, and so designed as to permit the belt to be readily loosened and rendered ineffective by the operator when it is not desired to use the machine driven thereby.

Further objects of the invention will appear from the following description and claims.

In one of its aspects the invention consists essentially in suitably journaled driving and driven wheels one of which, preferably the driving wheel, is of an expansible and contractible nature to permit variation of its effective circumference and a consequent variation of the speed-ratio of said wheels.

In the present embodiment of the invention the driving wheel is yieldingly expansible and is connected to the driven wheel by a belt which is under the control of a manually operated idler. Movement of the idler to tighten the belt will effect a contraction of the yielding driving wheel and a consequent reduction in the speed of the driven wheel. Movement of the idler to loosen the belt will permit the driving wheel to expand or increase its effective circumference sufficiently to take up the slack in the belt and turn the driven wheel at an increased speed. Further movement of the idler after the driving wheel has reached the limit of its expansion will loosen the belt sufficiently to break the driving relation between the driving and driven wheels. The yielding wheel, or wheel of variable effective circumference, preferably comprises a support which is adapted to be journaled for rotation and a series of belt-contactors mounted on said support for movement toward and away from the center of rotation. In order that said belt-contactors may be caused to partake of equal and simultaneous inward or outward movement, use is preferably made of a controller which may be in the form of a ring movable relatively to said support and adapted by means of suitable connections to control the working positions of said belt-contactors relatively to the center of rotation.

In the accompanying drawings, Figure 1 is a fragmentary transverse cross-sectional view of a power table embodying the invention. Fig. 2 is a side elevation of the driving-pulley or wheel. Fig. 3 is a disassembled perspective view of the driving pulley showing details of its construction. Fig. 4 is a longitudinal view of the driving pulley from the side opposite to that shown in Fig. 1.

In the preferred embodiment of the invention, as illustrated, the variable speed power-transmitting mechanism is incorporated in a power-table of the type commonly used in factories to support and supply power to a series of light machines such as sewing machines. The power table comprises a table-top 1 upon which is seated, for example, a buttonhole sewing machine 2 such as disclosed in my Patent No. 1,162,207, of November 30, 1915, and comprising a driven shaft 3 upon which is loosely fitted the driven pulley 4. The usual stop-mechanism 5, substantially such as that disclosed in my Patent No. 1,024,490, of April 30, 1912, is preferably utilized to establish and interrupt the driving connection between the driven pulley 4 and the driven or main-shaft 3 of the machine.

The power-shaft 6 which customarily extends lengthwise of the power table is journaled in suitable bearings beneath the table-top 1 and carries the driving pulley 7 which transmits power through the belt 8 to the driven pulley 4. Suitable stationary idlers 9, 10, carried by the bracket 11 secured to the under side of the table top 1, may be utilized if necessary to direct the course of the belt between the pulleys 7 and 4.

In the present instance the belt is also acted upon by a movable idler 12 which preferably is manually controlled. The idler 12 is journaled on the pin 13 fixed to the lever-arm extension 14 having a longitudinally extending slot 15 through which passes a bolt 16 serving to secure the lever-arm extension 14 to the downwardly extending lever-arm 17. The lever-arm extension 14 is formed with a belt-guard 14′ which retains the belt 8 in the belt-groove of the idler 12. By loosening the bolt 16 the working position of the idler 12 may be adjusted lengthwise of the lever-arm 17 and toward or away from the driving pulley 7, as may be desired.

The lever-arm 17 is fixed to the fulcrum-pin 18 journaled in an extension 19 of the bracket 11. Fixed to the pin 18 is the lever-arm 20 which extends upwardly through a slot 21 in the table top and terminates in a handle 22 which may be easily and conveniently manipulated by the operator to shift the idler 12 and vary the effective length of the belt 8.

In order that the lever-arm 20 may be detained in various positions of adjustment, it has pivotally connected thereto a pawl 23 the free end of which is adapted to engage any one of a series of teeth 24 on the rack-plate 25 secured to the table-top adjacent the slot 21. The rearward end of the rack 25 is formed with a tooth 26 which may be engaged by the hook 27 near the extremity of the pawl 23 to detain the lever-arm 20 in extreme rearward or dotted line position, Fig. 1, wherein the belt 8 is slackened to such an extent that it hangs loosely about the driving pulley 7 and is not driven by the latter. When the machine is not in use the handle 22 may be shifted rearwardly to its extreme position to disconnect the driven pulley 4 and belt 8 from the driving pulley 7, thus effecting a material saving of power and wear on the bearings of the various driven pulleys; the line-shaft 6 being allowed to run so that it may drive such other machines as are in use.

In order that the speed of the machine 1 may be varied to suit the particular class of work in hand, it is preferred to so construct the driving pulley 7 that its effective circumference may be varied to alter the speed-ratio of the driving and driven pulleys. Referring to Figs. 2, 3 and 4, it will be seen that the pulley 7 comprises a main supporting disk 28 which is formed at one side with a hub 29 and together with its hub is split at 30 to facilitate assembly about the driving shaft 6 to which the sections of the split disk are clamped by means of the bolts 31.

The inner face of the main supporting disk 28 is formed with a series of radial grooves or slide-ways 32 and carries a circularly arranged series of pins 33 disposed equi-distantly from and parallel to the shaft 6 and supporting the diametrically split guide-ring 34 in a plane spaced from and parallel to the disk 28.

Slidably mounted in the guide-ways 32 with an edge-face of each in contact with the guide-ring 34 are a series of peripherally spaced belt-contactor blocks 35 the outer ends of which are formed with U-shaped recesses or belt-engaging notches 36. The inner ends of the belt contactors are slotted at 37 to receive the outer ends of a series of links 38 of equal length, each of which links is secured to its respective belt-contractor by a corresponding pivot-pin 39.

The apertured inner ends of the links 38 are strung upon the semi-circular pivot-wires 39′, 39′ which are seated within the semi-circular grooves 40, 40′ in the end-faces of the sections of the split-collar 41 which is slidably mounted upon the shaft 6. The grooved end of the collar 41 is also formed with a series of radial slots 42 adapted to receive and properly space the inner ends of the links 38 when the pivot-wires are seated in the grooves 40 and 40′. A split retainer-ring 43 has its outer edge slotted radially to form a series of peripheral teeth 44 extending between the links 38 and acting to retain the pivot-wires 39′, 39′ in their grooves in the collar 41. The sections of the collar 41 are held together by the screw-bolts 41′ and the sections of the retainer-ring 43 are secured to their respective collar-sections by means of the screws 45.

It will be aparent that the collar 41 acts as a controller which is connected to the belt contactors 35 and insures equal and simultaneous movement of said belt-contactors inwardly or outwardly. Projecting from the split-ring 43 are a pair of stop-pins 46 the free ends of which strike the disk 28 and limit the inward or pulley expanding movement of the collar 41.

When the idler 12 occupies the dotted line position, Fig. 1, and the driving pulley 7 is rotating, the centrifugal force acting upon the belt-contactors 35 moves them outwardly until the stop pins 46 strike the disk 30. If it is desired to drive the machine 2 at relatively high speed the handle 22 is drawn forwardly until the belt has been tightened sufficiently to grip the driving pulley 7 and shift the yielding belt-contactors inwardly a slight distance. In other words, the belt is tightened enough to take the strain caused by the centrifugal force which acts upon the belt-contactors 35. This position represents the maximum effective driving circumference of the pulley 7. Having made this adjustment, the machine may be started and stopped in the usual manner through the action of the stop-mechanism 5.

If it is desired to drive the machine at a lower speed, the handle 22 is pulled forwardly to shorten the effective length of the belt, thereby overcoming the centrifugal force of the yielding belt-contactors 35 and causing the latter to move inwardly toward their center of rotation. Such action causes a diminution of the effective circumference of the driving pulley, as will be readily understood. It will be seen by referring to Fig. 1 that the belt-guard 14′ is behind the belt-section leading from the driving pulley 7 to the idler 9. In other words the belt-guard 14′ and idler 12 move in a plane slightly to one side of said belt-section so as not to strike the latter when the handle 22 is drawn forwardly to its extreme position.

The spaced belt-contactors of a pulley of the present character will tend to grip the belt tightly since the belt lies in substantially straight lines connecting the spaced belt-engaging groove 36 and is rather sharply bent over successive belt-contactors, as shown in Fig. 1.

In various machines controlled by start- and stop-motion devices the mechanism is such that, when thrown to starting position, the main-shaft of the machine is practically instantly connected to the loose pulley, thereby throwing a sudden and excessive load upon the belt or, in other words, striking the belt a blow, the constant repetition of which will stretch and weaken the belt. In mechanism of the present character, the yieldingly expansible and contractible pulley will yield to this sudden blow upon the belt and lessen the strain produced therein when the machine is started. The life of the belt will accordingly be materially increased.

The invention is not to be understood as limited to the exact form and arrangement of the parts shown and described since many modifications, alterations, substitutions and the like, will be apparent from the foregoing description to those skilled in the art.

Having thus set forth the nature of the invention, what I claim herein is:—

1. In variable speed power-transmitting mechanism, in combination, a driven wheel, a driving wheel, a belt connection between said wheels, an idler for said belt, one of said wheels being expansible and contractible to vary its effective circumference, and manually controlled means for shifting said idler to thereby vary the effective circumference of said one of said wheels.

2. In power-transmitting mechanism, a driving wheel, a driven wheel, a belt connection between said wheels and a manually controlled idler for said belt, one of said wheels being automatically expansible and yieldingly contractible to maintain driving relation with said belt as the latter is tightened or loosened by manual manipulation of said idler, whereby the speed of the driven wheel may be manually regulated.

3. In variable speed power-transmitting mechanism, in combination, a constant speed driving wheel, a driven wheel, a belt-connection between said wheels, and a manually controlled idler for said belt, the driving wheel being free to expand centrifugally to take up the slack in the belt and maintain driving relation therewith regardless of the position of adjustment, within limits, of said idler.

4. In variable speed power-transmitting mechanism, in combination, a table, a machine to be driven supported thereby, a yieldingly expansible driving pulley mounted below said table, a belt-connection between said driving pulley and machine, a manually controlled lever, an idler carried by said lever and engaging said belt, and means for retaining said lever in adjusted position.

5. In variable speed power-transmitting mechanism, in combination, a table, a machine to be driven supported thereby, a yieldingly expansible driving pulley mounted below said table, a belt-connection between said driving pulley and machine, a manually operated controlling lever for said belt pivoted beneath the table and formed with a handle accessible at the side of the machine, and a rack and pawl for retaining said lever in adjusted position.

6. In variable speed power-transmitting mechanism, in combination, a constant speed driving shaft, a driven shaft, a pulley-wheel carried by one of said shafts, a belt-connection between said pulley-wheel and the other of said shafts, said pulley wheel being free to expand and maintain driving relation with said belt as the latter is loosened, a shiftable idler for said belt, said idler having a range of belt-loosening movement greater than the range of expansion of said pulley-wheel, whereby the driving relation of said wheel and belt may be broken by adjustment of said idler.

7. In a power-transmitting mechanism, in combination, driving and driven shafts having their axes fixed relatively to each other, driving and driven wheels carried thereby, one of said wheels being yieldingly contractible, a belt passing loosely around said wheels, an idler manually shiftable to tighten said belt, said idler being also manually shiftable sufficiently to loosen the belt and break the driving relation between said shafts.

8. In variable speed power-transmitting mechanism, in combination, a shaft, a pair of parallel disks carried by said shaft, a series of belt-contactors mounted between said disks for sliding movement toward and from said shaft, the length of the contact between the belt-contactors and the disks being at least equal to the distance between said disks, a single collar mounted on and slidable lengthwise of said shaft, and a single series of links connecting said collar with said belt-contactors, the connection between each link and its respective belt contactor being substantially centrally between the planes of said disks, whereby cramping of the belt-contactors is prevented.

9. In variable speed power-transmitting mechanism, in combination, a shaft, a disk fixed to said shaft and formed with a series of radial slide-ways, a second disk spaced from said first mentioned disk formed with a corresponding series of radial slots, belt-contactors mounted between said disks to move along said slide-ways, a collar mounted on and slidable lengthwise of said shaft, and a series of push-and-pull rods connecting said belt-contactors with said collar, said rods extending through the slots of said second mentioned disk and being connected with said belt-contactors at points between said disks.

In testimony whereof I have signed my name to this specification.

EDWARD B. ALLEN.